United States Patent [19]

Yoshimura et al.

[11] Patent Number: 4,497,728
[45] Date of Patent: Feb. 5, 1985

[54] CONDUCTIVE PYROLYTIC PRODUCT AND COMPOSITION USING SAME

[75] Inventors: Susumu Yoshimura; Mutsuaki Murakami, both of Kawasaki, Japan

[73] Assignee: Matsushita Electric Industrial Co., Ltd., Japan

[21] Appl. No.: 496,300

[22] Filed: May 19, 1983

Related U.S. Application Data

[62] Division of Ser. No. 247,316, Mar. 25, 1981, Pat. No. 4,401,590.

[30] Foreign Application Priority Data

| Mar. 26, 1980 | [JP] | Japan | 55-39305 |
| Apr. 14, 1980 | [JP] | Japan | 55-49376 |
| Aug. 11, 1980 | [JP] | Japan | 55-110556 |
| Aug. 11, 1980 | [JP] | Japan | 55-110567 |
| Aug. 13, 1980 | [JP] | Japan | 55-112162 |

[51] Int. Cl.³ .............................................. C08G 73/08
[52] U.S. Cl. ..................................... 252/514; 252/500; 252/502; 252/503; 252/512; 252/513; 524/599; 524/600; 524/602; 524/606; 524/609; 524/611; 524/612; 528/353; 528/481

[58] Field of Search ........ 252/500, 502, 503, 512–514; 524/599, 600, 602, 606, 609, 611, 612; 528/353, 481

[56] References Cited

U.S. PATENT DOCUMENTS

| 3,410,834 | 11/1968 | Pruckmayr | 528/363 |
| 3,518,234 | 6/1970 | Hara et al. | 528/481 |
| 3,575,941 | 4/1971 | Steinberg | 528/481 |
| 3,607,810 | 9/1971 | Schopf et al. | 528/363 |
| 3,629,198 | 12/1971 | Steinmann | 528/363 |
| 3,817,941 | 6/1974 | Bair et al. | 528/481 |
| 3,819,587 | 6/1974 | Kwoleck | 528/481 |
| 3,961,009 | 6/1976 | Yoda et al. | 528/481 |
| 4,016,140 | 4/1977 | Morello | 528/481 |
| 4,040,990 | 8/1977 | Neely | 528/481 |

Primary Examiner—Lester L. Lee
Attorney, Agent, or Firm—Lowe, King, Price & Becker

[57] ABSTRACT

A conductive pyrolytic product obtained by thermally treating specific types of heat-resistant polymers including polyamide-imide, an aromatic polymer having a heterocyclic ring of a specific type and an aromatic polyamide under certain temperature and atmospheric conditions. A conductive composition using the pyrolytic product in the form of a powder is also disclosed.

7 Claims, 19 Drawing Figures

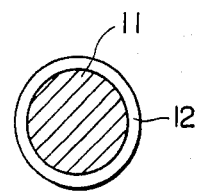
FIG. 11a
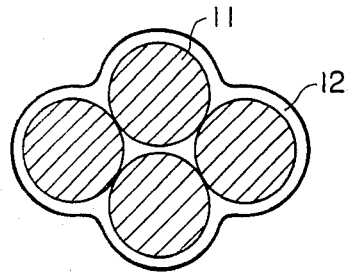
FIG. 11b
FIG. 11c
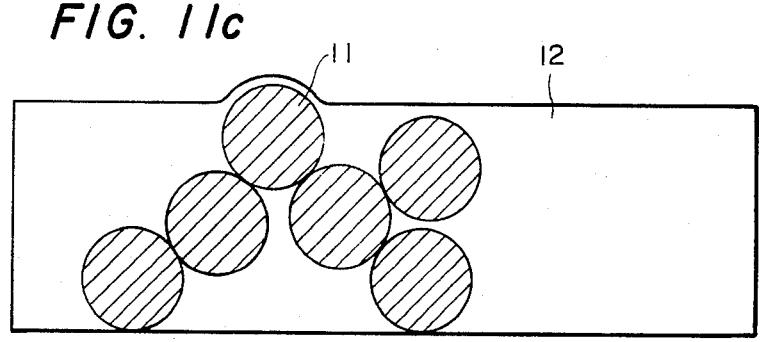
FIG. 12
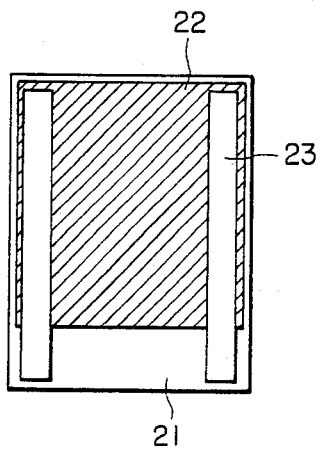

CONDUCTIVE PYROLYTIC PRODUCT AND COMPOSITION USING SAME

This is a division of application Ser. No. 247,316, filed Mar. 25, 1981, now U.S. Pat. No. 4,401,590.

BACKGROUND OF THE INVENTION

1. Field of the Invention

This invention relates to the electronic and electrical arts and more particularly, to specific and novel type of conductive materials obtained from heat-resistant organic polymeric materials by thermal or pyrolytic treatment. It also relates to conductive compositions using such a specific type of conductive pyrolytic materials in the form of powders.

2. Description of the Prior Art

In recent years, attempts have been made to actively develop sensors or heaters using organic materials which have been imparted with electrical conductivity and showing a specific performance which is not experienced in those using known metallic conductors. In 1964, S. D. Bruck of IBM Corp. discovered that when thermally decomposed or pyrolyzed at temperatures higher than 800° C., a polyimide film (Kapton H film of I. E. Du Pont de Nemours) is converted to an electrical conductor having a specific resistance of $5 \times 10^{-2}$ $\Omega$cm. The specific resistance of polyimide film is usually at a level of $10^{-18}$ $\Omega$cm at a normal temperature and thus the film varies in resistance in the order of $10^{20}$ by the pyrolysis. In one sense, this pyrolytic technique is considered as excellent to impart electrical conductivity to the polymer. However, the technique is not always applicable to all polymer materials. In fact, most polymeric materials are not converted into materials of high conductivity when subjected to the pyrolysis. Further, the conductors obtained by the pyrolysis have a common disadvantage in that they are brittle and show much reduced flexibility, coupled with another disadvantage that a maximum value of conductivity is about $200\Omega^{-1}$ cm$^{-1}$ which is unsatisfactory as a conductor.

Fundamental requirements for polymeric materials which are capable of being converted into materials of high conductivity by the pyrolytic technique are considered as follows: (1) The pyrolysis is stopped at a certain stage; (2) A re-combination reaction proceeds as the pyrolysis proceeds; and (3) There are present unsaturation bondings in sufficient amounts in the re-combined product. However, it is not known at present what type of polymeric material or molecular structure can satisfy the above requirements. In order to satisfy the requirements, it seems essential that the melting point of the polymeric material be higher than its decomposing temperature. This is because a material whose melting point is lower than its decomposing temperature will be melted and evaporated on heating at the decomposing temperature prior to occurrence of the pyrolytic reaction. In view of the above, widely employed polymeric materials such as polyester, polystyrene, polyvinyl chloride, polyethylene, polypropylene and the like can not be used for the purpose. Accordingly, the pyrolysis technique may be applicable to heat-resistant polymers such as polyimide, polybenzimidazole, polydiphenyl ether, polyparaphenylene and the like. However, the condition where the melting point is higher than the decomposing temperature is a necessary one but not a satisfactory one. For instance, in the case of polyparaphenylene, its pyrolytic reaction does not stop at a stage and continues to proceed until it is decomposed.

Organic conductors obtained by pyrolysis can be classified as low dimensional conductors. A low dimensional conductor means a material which shows high electrical conductivity only in a linear direction (i.e. one dimension) or in a plane direction (two dimensions) which is different from known three-dimensional conductors as is discussed in "Chemistry and Industry", April, 1979, pp. 221-240. That is, it is assumed that organic conductors of pyrolytic polymers in which starting polymers undergo a condensation reaction by pyrolysis have a plane or two-dimensional structure. As described hereinbefore, it is reported that the Kapton H film (polyimide) of I. E. Du Pont de Nemours is converted into a conductor when pyrolyzed in vacuo ("Polymer" vol. 5, page 435, 1964). Further, it is also reported by a Russian group in 1963 that polyacronitrile is converted by pyrolysis into a material having a specific resistance of $5 \times 10^{-1}$ $\Omega$cm (A.V. Airapetjanc et al, Dokl. Akad, Nauk SSR Vol. 148, p. 605, 1963). These pyrolytic polymers are advantageous in their high resistance to heat but are considered to be inferior to carbon black or graphite when applied as a material of low resistance. Further, they are also considerably poorer in film-forming properties and flexibility as compared with ordinary polymers and can not stand use even when supported on a base material.

SUMMARY OF THE INVENTION

It is an object of the present invention to provide novel conductive organic materials or pyrolytic products which are obtained by thermally treating or pyrolyzing a specific type of heat-resistant organic polymers at controlled temperatures.

It is another object of the invention to provide conductive organic materials which show low dimensional conductivity and can thus be applied in the specific field of electronics as a conductor or resistor.

It is a further object of the invention to provide conductive organic materials which show excellent heat stability and are applicable as a heater.

It is a still further object of the invention to provide conductive compositions using the conductive organic materials of the just-mentioned type as powders either singly or in combination with known metallic powders.

It is another object of the invention to provide conductive compositions which can cover wide ranges of specific resistance and sheet resistivity as will not be experienced in known silver or carbon black conductive compositions.

It is another object of the invention to provide conductive compositions which are more inexpensive than known silver or other metal conductive compositions.

The above objects can be achieved, according to one aspect of the invention, by a conductive organic material or pyrolytic product which is obtained by thermally treating polyamide-imide, an aromatic polymer having a heterocyclic ring such as a thiazole ring, oxazole ring, oxadiazole ring, thiadiazole ring, oxadiazolyl ring, triazole ring, tetrazopyrene ring or quinozaline ring, or an aromatic polyamide resin having recurring units of the general formula

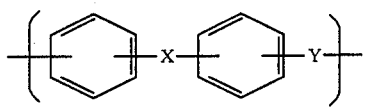

in which X and Y independently represent —NHCO— or —OCHN—, at a temperature ranging from 400° C. to 1000° C. when the polyamide-imide and the aromatic polyamide resins are employed and at a temperature ranging from 600° C. to 1000° C. when the aromatic polymer having the heterocyclic ring is used, in vacuo or in an inert atmosphere.

By the heat treatment, the polymers which inherently show little or no electric conductivity are converted into conductive ones. The degree of conductivity may vary depending on the treating temperature and time and the type of the starting polymer.

According to another aspect of the invention, there is provided a conductive composition which comprises a film-forming polymer binder and a powder of the pyrolytic product of the just-mentioned type. The powder of these pyrolytic products shows good affinity for or miscibility with polymer binders and other conductive powders such as metallic powders and can be mixed in almost any arbitrary ratios, if desired. This is very advantageous, especially when the powder is used in combination with a metallic powder, because an expensive metallic powder can be reduced in amounts without a sacrifice of electrical properties and thus a more inexpensive composition can be obtained. The polymer binder is usually used in an amount of 10 to 50 wt% of the composition similarly to known compositions using a metallic powder such as silver, or a graphite or carbon black powder.

BRIEF DESCRIPTION OF THE DRAWINGS

FIGS. 11a through 11c are schematic views showing carbon black or graphite particles covered with a pyrolytic product thereon;

FIG. 12 is a schematic plan view showing an element using a pyrolytic or thermally treated product according to the invention as a resistor or conductor;

DETAILED DESCRIPTION AND EMBODIMENTS OF THE INVENTION

As briefly stated hereinbefore, polymers which are conveniently convertible into conductive ones by thermal treatment or pyrolysis according to the invention include polyamide-imide resin, aromatic polymers having a heterocyclic ring and aromatic polyamide resins having recurring units of the general formula defined before.

Figure 1:
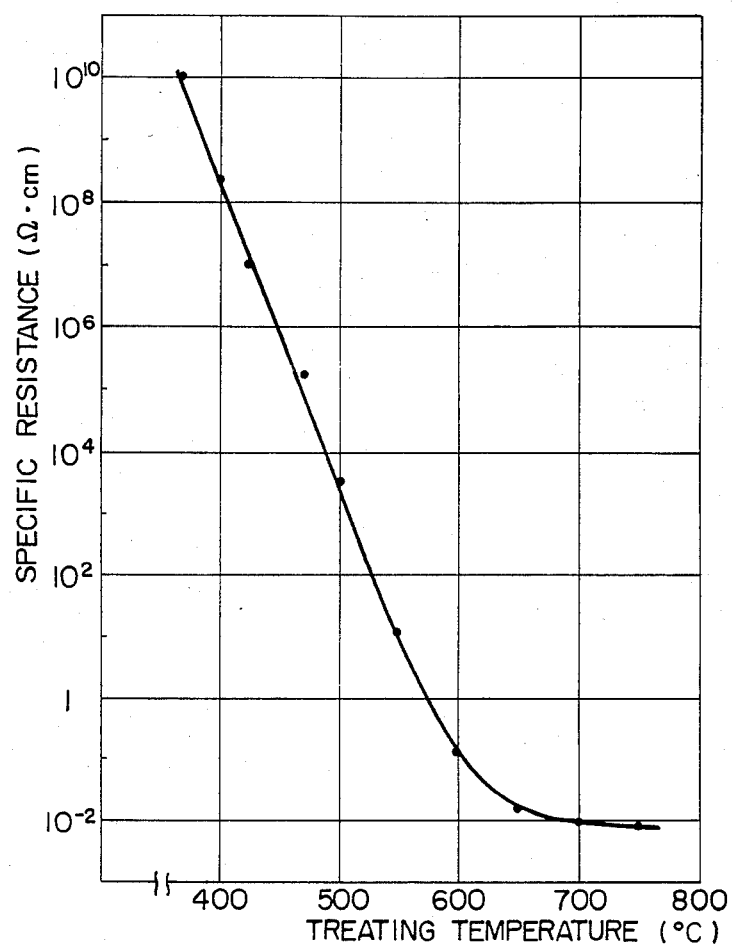
FIG. 1 is a graph showing a relation between a specific resistance of a polyamide-imide resin which has been thermally treated in vacuo for 4 hours and a temperature for the thermal treatment.

First, the polyamide-imide resin is described. In FIG. 1, there is shown a specific resistance of a polyamide-imide resin film (e.g. HI-400, product of Hitachi Chemical Co., Ltd.) which has been thermally treated for 4 hours in vacuo for conversion into an electric conductor in relation to a variation in treating temperature. As the treating temperature increases, the specific resistance decreases and it reaches $10^{-1}$ $\Omega$cm at the treating temperature of 600° C. The specific resistance reaches $10^{-2}$ $\Omega$cm at the treating temperature of 650° C. and is held almost constant at higher temperatures up to about 1000° C. That is, the conductive product obtained by thermally treating the polyamide-imide resin has a minimum specific resistance of about $1 \times 10^{-2}$ $\Omega$cm. This value is smaller than that of a material obtained by pyrolyzing a polyimide film. In addition, the polyamide-imide is convertible into the conductive material by the heat treatment even at temperatures much lower than in the case of a polyimide film. For instance, in order to impart a specific resistance of $2 \times 10^{-2}$ $\Omega$cm to a thermally treated or pyrolytic product, a polyimide resin needs a treating temperature of 800° C. and the treating temperature for the polyamide-imide resin is 650° C. in both cases where the heat treatment is continued for 4 hours.

According to S. D. Bruck, it is reported that the pyrolytic polyimide which has been obtained by thermally treating in vacuo at 620° C. for 1 hour has values of elementary analysis: C; 76.4%, H; 3.4%, O; 14.0%, and N; 5.9%. It is also reported that the polyimide film subjected to a heat treatment of 700° C. for 1 hour has values of elementary analysis: C; 88.0%, H; 2.8%, O;

7.2% and N; 4.8% and when the heat treatment is conducted at 800° C., no oxygen component is present (J. Polymer Science , C, No. 17, 169(1967). In contrast, the elementary analysis of polyamide-imide resin subjected to a heat treatment of 550° C. for 4 hours revealed that C; 73.8%, H; 2.6%, O; 16.8% and N; 6.8% and similarly, when the heat treatment was conducted at 650° C. for 4 hours, the values of the elementary analysis were as follows: C; 83.5%, H; 2.5%, O; 9.5% and N; 4.3%. From the above it will be noted that when the elementary compositions of both pyrolytic products are compared in a minimum value of the specific resistance, no oxygen is present in the case of the product derived from polyimide but the product from the polyamide-imide contains about 10% of oxygen component. This demonstrates that these pyrolytic products are different from each other in structure.

Figure 2:
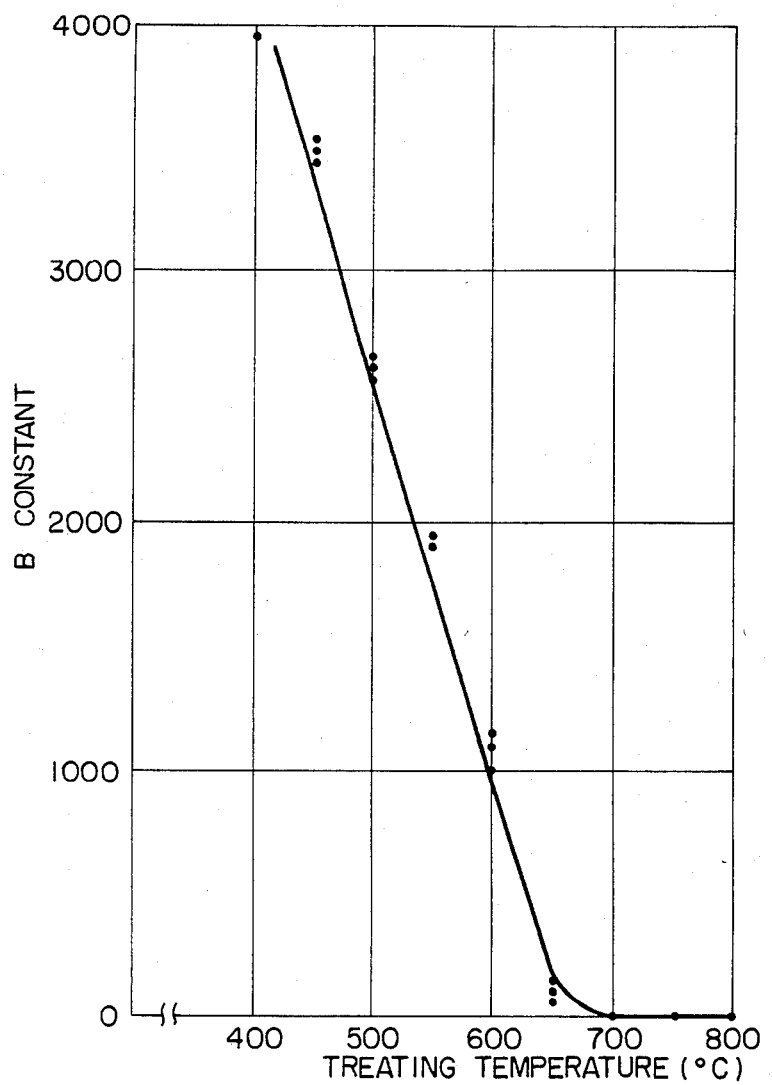
FIG. 2 is a graph showing a relation between a B constant of a polyamide-imide resin which has been thermally treated in vacuo for 4 hours and a temperature for the thermal treatment.

FIG. 2 shows a relation between the treating temperature for the polyamide-imide resin and the B constant of the resulting material. The pyrolytic material exhibits a B constant of about 4000 when the treating temperature is 400° C. and about 2700 when the treating temperature is 500° C. The B constant of the material obtained by the heat treatment at temperatures above 700° C. is zero and thus shows a metallic behavior. That is, this pyrolytic conductive material can be varied in nature to cover wide ranges of the specific resistance and B constant by properly controlling the heat treating temperature. Accordingly, the conductive material obtained by the thermal treatment of the polyamide-imide resin is utilizable not only as an ordinary conductor, but also as a temperature sensor or a specific type of resistor making use of the large B constant. In order to apply it as a conductor or resistor, it is important that desired levels of specific resistance and B constant are developed reproducibly by suitably controlling the heat-treating conditions. The specific resistance or B constant may be appropriately controlled by controlling either the treating temperature or treating time.

Figure 3:
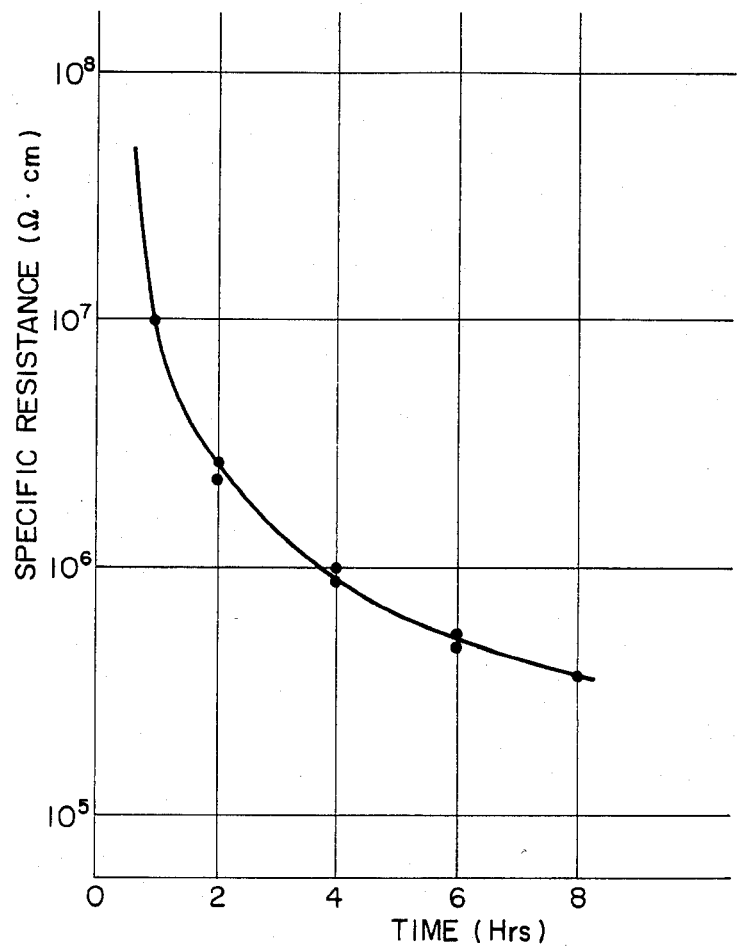
FIG. 3 is a graph showing a relation between a specific resistance of a polyamide-imide resin which has been thermally treated at 450° C. and a thermally treating time.

In FIG. 3, there is shown a relation between a specific resistance and a treating time in the case where the treating temperature is held constant at 450° C. From the figure, it will be seen that even when the treatment at 450° C. is continued over 8 hours, the specific resistance does not become constant and the pyrolytic reaction is proceeding. In other words, the values of the specific resistance and B constant greatly vary depending on the treating time particularly in ranges where the specific resistance and B constant are great in value, so that it is not practical to use the treating time as a control measure in such ranges. In general, in order to obtain a resistor having a specific resistance of below $10^{10}$ Ωcm, the treating temperature is desired to be above 400° C. Lower temperatures require a very long period of time for making a pyrolytic material having desired levels of the specific resistance and B constant.

Gathering the foregoing, the polyamide-imide resin can be converted into a pyrolitic material having a desired level of conductivity by thermally treating it in vacuo at temperatures of from 400° C. to 1000° C. As a matter of course, the treatment can be suitably effected in an inert atmosphere such as nitrogen though the treating time becomes more or less longer.

The conductive pyrolytic material thus obtained from the polyamide-imide resin may be obtained in any desired forms since a shape of the resin prior to the heat treatment can be kept as it is after the treatment.

Further, the conductive material can be readily finely powdered by any of known techniques. This powder may be dispersed in a polymer binder and printed in a desired pattern as usual. Generally speaking, the resistor or conductor of the dispersion type has a vital drawback that added powder particles tend to aggregate and are difficult to uniformly disperse, resulting in unstable resistance. The pyrolytic polyamide-imide contains a large quantity of hydrogen atoms therein which is different from graphite or carbon black and is readily miscible with most of polymer binders.

The polyamide-imide resin used herein is intended to mean any of known ones having imide and amide bondings in recurring units thereof, typical of which is one obtained by reaction between insophthalolyl chloride, methaphenylene diamine and pyromellitic anhydride.

Aromatic polyamide resins are another type of a resin convertible into conductive ones by the heat treatment under relatively low temperature conditions according to the invention are are described.

Polyamide polymers are usually obtained by reaction between aliphatic dibasic acids and diamines and include well-known polymers such as nylon 6, nylon 66, nylon 610, etc. When subjected to the pyrolytic reaction, these polymers are melted and evaporated and thus are not converted into conductive materials. We have found that aromatic polyamide resins having aromatic rings in the main chain thereof can be converted into conductive materials by the pyrolytic technique.

The aromatic polyamide resins are also thermally treatable even at lower temperatures than the known polyimide resin.

The aromatic polyamide resins useful in the present invention are those obtained from acid chlorides and diamines and are represented by recurring units of the formula

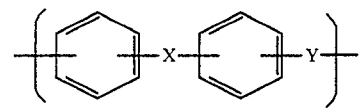

in which X and Y independently represent —NHCO— or —OCHN—. Suitable examples of the acid chloride include phthaloyl chloride, isophthaloyl chloride, terephthaloyl chloride, and the like and examples of the diamine include phenylenediamine, benzidine, diaminostilbene, diaminodiphenylmethane, diaminomephthalene, diaminoazobenzene and the like.

These aromatic polyamide resins can be suitably pyrolytically treated at temperatures of 400° to 1000° C.

Figure 4:
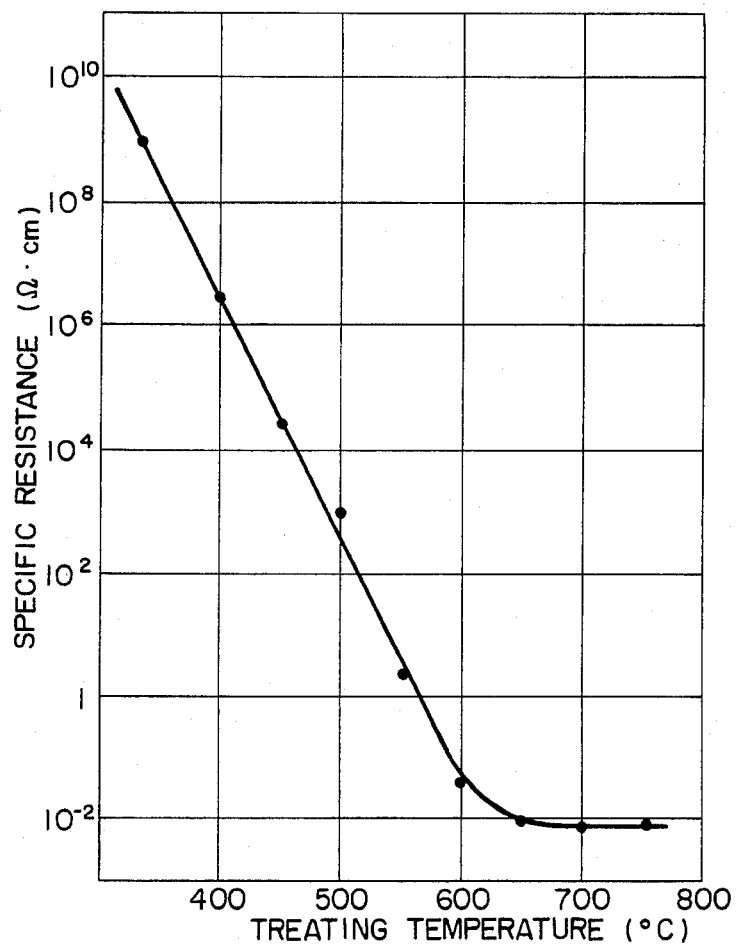
FIG. 4 is a graph showing a relation bewteen a specific resistance of an aromatic polyamide resin thermally treated in vacuo for 4 hours and a treating temperature.

In FIG. 4, there is shown a relation between a specific resistance and a treating time with respect to a conductive material which has been obtained by thermally treating in vacuo for 4 hours an aromatic polyamide obtained from m-phenylenediamine and isophthaloyl chloride and represented by recurring units of the formula

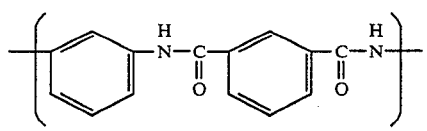

From the figure it will be seen that the specific resistance decreases with an increase of the treating temperature and it reaches $5\times10^{-2}$ $\Omega$cm at the temperature of 600° C. The specific resistance reaches about $1\times10^{-2}$ $\Omega$cm at 650° C. and is held almost constant even at higher temperatures. That is, a minimum specific resistance of the thermally treated aromatic polyamide conductive material is found to be $1\times10^{-2}$ $\Omega$cm. This value is smaller than that of a conductive material obtained by pyrolyzing a polyimide film and the treating temperature is much lower. The above data are obtained in vacuo and similar results are obtained in an atmosphere of an inert gas though the treating time becomes longer.

The elementary analysis for the aromatic polyamide resin subjected to the thermal treatment for 4 hours revealed that C; 77.5%, H; 3.8%, O; 10.1% and N; 8.8% at 550° C. and C; 86.5%, H; 3.0%, O; 4.2% and N; 6.2% at 650° C.

When comparing these results with those of the polyimide shown hereinbefore in a condition where the specific resistance is in a minimum, the pyrolytic material obtained from the aromatic polyamide contains much larger amounts of oxygen and nitrogen, showing that the pyrolytic products obtained from the aromatic polyamide and polyimide are different in structure from each other.

Figure 5:
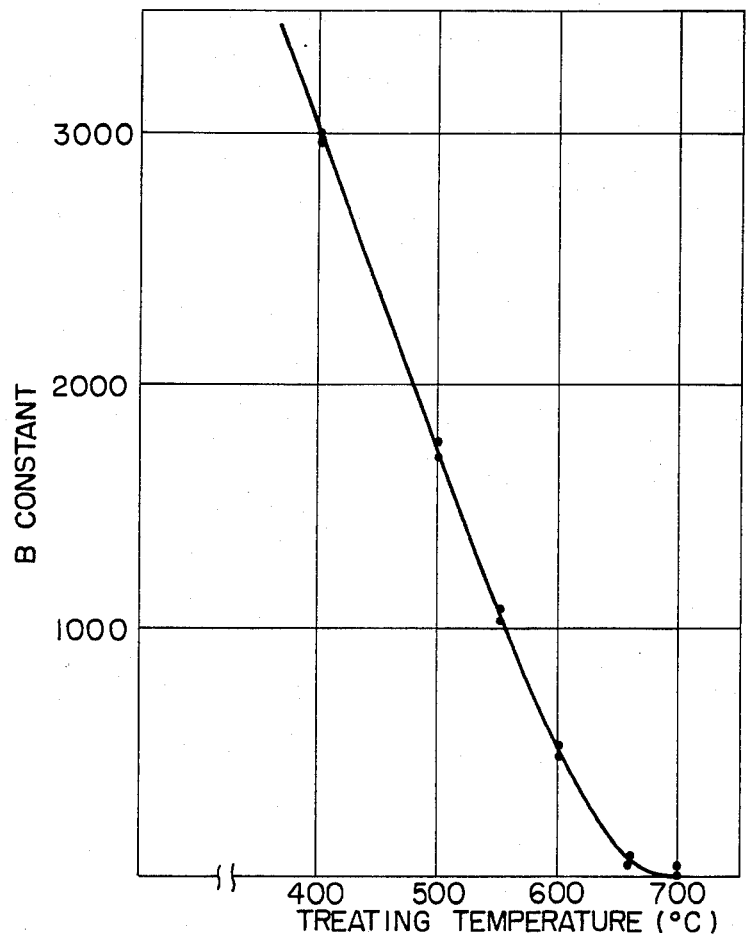
FIG. 5 is a graph showing a relation between the B constant and a treating temperature for the aromatic polyamide resin used in FIG. 4.

FIG. 5 shows a relation between the B constant of the pyrolytic conductive material obtained by the treatment for 4 hours and the treating temperature for the aromatic polyamide, from which it is found that the material treated at 400° C. has a B constant of 3000 and that obtained at 500° C. has a B constant of 1700.

When the aromatic polyamide is treated at temperatures higher than 650° C., the B constant becomes zero. Thus, the B constant and specific resistance can be varied over wide ranges by suitably controlling the temperature. This implies that the pyrolytic aromatic polyamide is applicable not only as a conductor, but also as a temperature sensor or a specific type of resistor.

It is general that when a temperature sensor is operated using an electronic circuit, an optimum impedance for the sensor is in the range of $10^3-10^7\Omega$. Accordingly, the specific resistance of a resistor is desired to be below $10^{10}$ $\Omega$cm even though its shape is properly designed. In this sense, the treating temperature for the aromatic polyamide is needed to be above 400° C. As a matter of course, it is possible to obtain a pyrolytic material from the aromatic polyamide by thermally treating it at temperatures below 400° C. but such thermal treatment may undesirably require a much longer time.

A further type of pyrolyzable polymers which can satisfy the requirements (1) through (3) discussed thereinbefore are heat-resistant heterocyclic aromatic polymers. The heterocyclic aromatic polymers mean those which contain in the molecule thereof a heterocyclic ring such as thiazole ring, oxazole ring, oxadiazole ring, thiadiazole ring, oxadiazolyl ring, triazole ring, tetraazopyrene ring and quinoxaline ring. These polymers are converted into pyrolytic products under similar conditions described with regard to the polyamide-imide resin and aromatic polyamide resins except that the lower limit of the treating temperature is higher than that used for the former two polymer resins, i.e. in the range of 600° C. to 1000° C.

Figure 6:
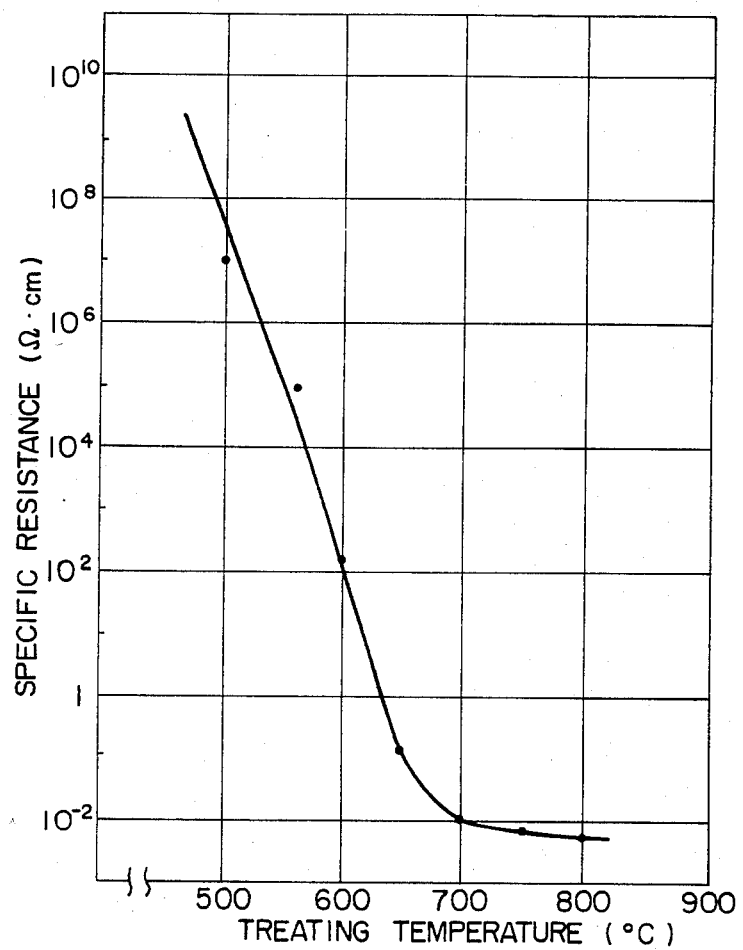
FIG. 6 is a graph showing a relation between a specific resistance of a pyrolytic product obtained by thermally treating a polyoxydiazole film for 4 hours and a treating temperature.

FIG. 6 shows a relation between a specific resistance and a treating time with regard to a product obtained by thermally treating a polyoxydiazole resin in vacuo for 4 hours. From the figure, it will be clearly seen that the specific resistance decreases with an increase of the treating temperature and reaches $1\times10^{-2}$ $\Omega$cm at the treating temperaure of 700° C. This value is $\frac{1}{8}$ time as low as the specific resistance of the polyamide film thermally treated at 800° C.

Figure 7:
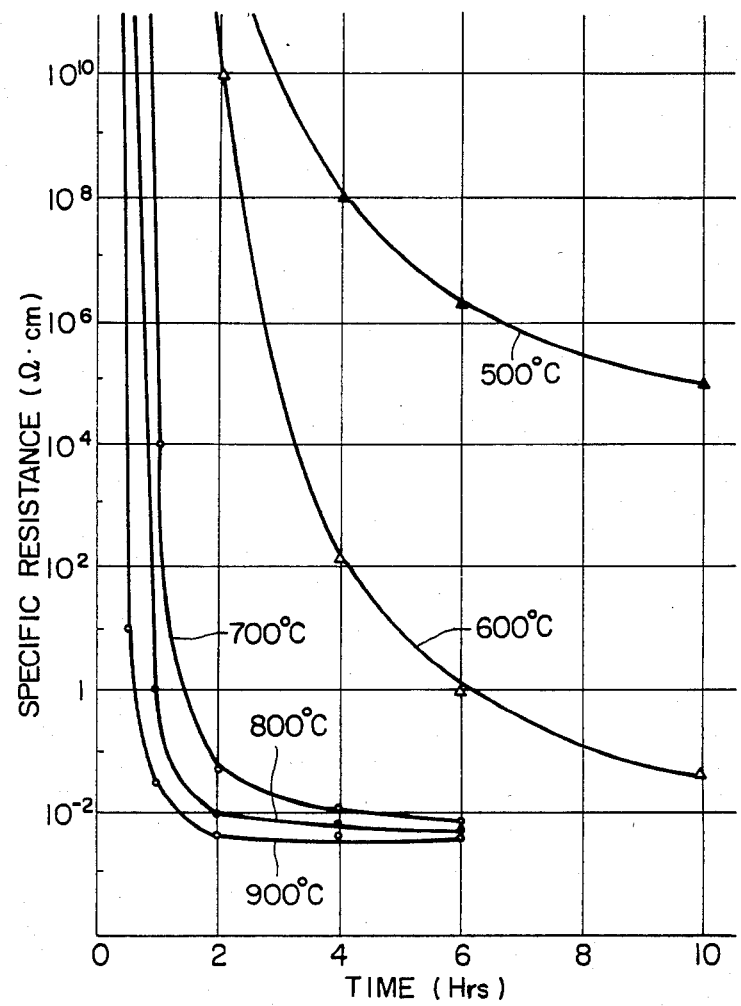
FIG. 7 is a graph showing relations between a specific resistance of a polyoxydiazole film treated at different temperatures and a treating time.

FIG. 7 shows the relation similar to FIG. 6 but for different temperatures. From the figure it is seen that in order to attain a specific resistance of $1\times10^{-2}$ $\Omega$cm, it is necessary to take 1.0 hours at 1000° C., 1.2 hours at the treating temperature of 900° C., 2.0 hours at 800° C., 4.0 hours at 700° C. and 10 hours or more at 600° C. Accordingly, especially when a pyrolytic product with such a low specific resistance is desired, treating temperatures higher than 700° C. are preferable.

These characteristics shown in FIGS. 6 and 7 are obtained as the result of the heat treatment in vacuo using a rotary pump. Where an inert gas (nitrogen, helium or the like) is used instead of vacuum, it takes a longer time of the heat treatment but there may be similarly obtained a product with a specific resistance of $1\times10^{-2}$ $\Omega$cm. For instance, when the heat treatment is conducted in nitrogen of 1 atmospheric pressure, it takes 2 hours at 900° C., 4 hours at 800° C. and 6 hours at 700° C. before the specific resistance reaches $1\times10^{-2}$ $\Omega$cm.

Figure 8:
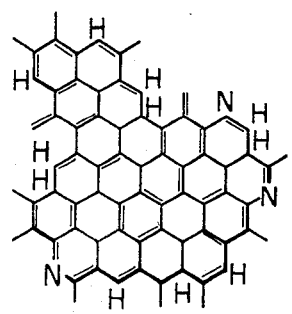
FIG. 8 is a schematic view showing an expected structure of a pyrolytic product of polyamide-imide thermally treated at 800° C.

The elementary analysis for a pyrolytic product of polyoxadiazole resin thermally treated at 700° C. for 2 hours revealed that C; 75.0%, H; 2.7%, O; 9.2% and H; 14.0% and that for a pyrolytic product obtained by the thermal treatment at 800° C. for 4 hours revealed that C; 76.4%, H; 2.7%, O; 8.0% and N; 13.1%. That is, these pyrolytic product also contain larger amounts of nitrogen and oxygen atoms than that obtained from the known polyimide resin. Accordingly, the product obtained by the thermal treatment of polyoxadiazole is different in structure from that obtained from polyimide. That is, it is assumed from data of the elementary analysis and ESR and X-ray analyses that a pyrolytic product obtained from polyimide by thermal treatment at 800° C. has the structure of FIG. 8.

Figure 9:
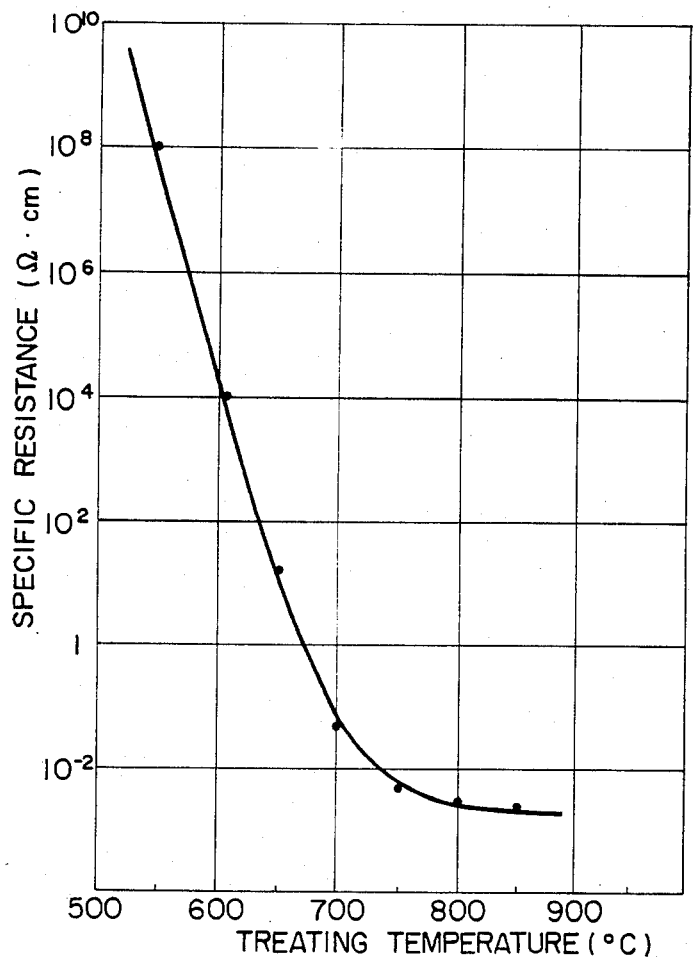
FIG. 9 is a graph showing a relation between a specific resistance of a pyrolytic product of poly(2,5-thiazolyl-p-pheylene) film thermally treated in vacuo for 4 hours and a treating time.

FIG. 9 shows a relation between a specific resistance and a treating temperature with respect to a pyrolytic product obtained by thermally treating a poly(2,5-thiazolyl-p-phenylene) film in vacuo for 4 hours. The specific resistance of this film reaches $6\times10^{-3}$ $\Omega$cm when the heat treatment is conducted at 700° C. and $2\times10^{-3}$ $\Omega$cm at a treating temperature of 800° C. Although the heat treating temperature is not lower than in the case of polyimide, the specific resistance becomes smaller by one order of magnitude or more. That is, this polymer can yield a pyrolytic product of higher conductivity than polyimide.

Figure 10:
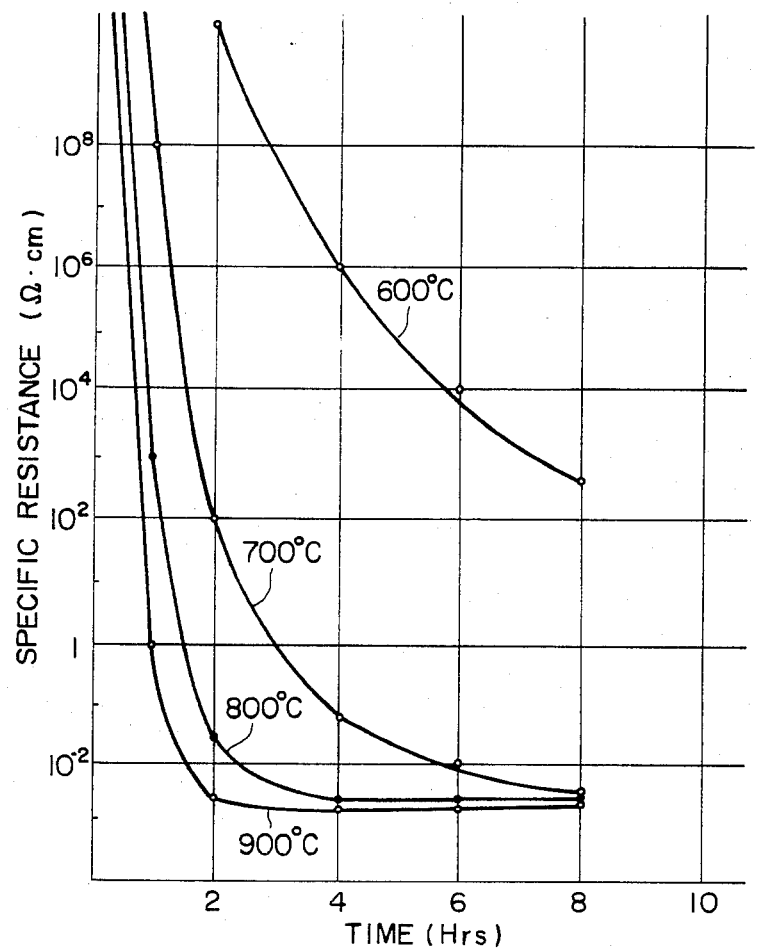
FIG. 10 is a graph showing a relation between a specific resistance of the pyrolytic product used in FIG. 9 and a treating time for different temperatures.

FIG. 10 shows a relation between a specific resistance of a pyrolytic product of polythiazolylphenylene and a treating time for different treating temperatures. From the figure it is seen that in order to obtain a pyrolytic product having a specific resistance of below $4\times10^{-2}$ $\Omega$cm, it takes 2 hours at 900° C., 4 hours at 800° C. and 8 hours at 700° C. The elementary analysis of the film product obtaned by treating the polythiazolylphenylene at 800° C. for 4 hours revealed that it contained 8.5% sulfur component. Thus, this product is believed to have a structure different from the assumed structure of the pyrolytic product of polyimide.

Then, polythiadiazole was thermally treated by a similar procedure. In this case, the sample was in the form of fibers. Accordingly, a product obtained after the thermal treatment was powdered and then formed into pellets to determine its specific resistance. As a result, it was found that the specific resistance of a product was $1\times10^{-1}$ Ωcm under treating conditions of 700° C. and 4 hours and $1\times10^{-2}$ Ωcm under treating conditions of 800° C. and 4 hours. These values are at the same levels as those of the pyrolytic product of the polyoxydiazole but since the polythiadizole product is measured in the form of a powder, a true specific resistance is considered to be smaller than that of the product from the polyoxydiaxole.

In Table 1, there are shown specific resistance values of pyrolytic products obtained by thermally treating several other heterocyclic aromatic polymers in vacuo at 800° C. for 4 hours. These samples are obtained only in the form of powders and the specific resistance is determined as pellets.

TABLE 1

| Polymer | Specific Resistance |
| --- | --- |
| Poly-2,2'-(m-phenyl)-6,6'-benzothiazole | $1 \times 10^{-1}$ Ωcm |
| Polybenzoxazole | $1.5 \times 10^{-1}$ Ωcm |
| Polytetrazopyrene | $1 \times 10$ Ωcm |
| Poly(m,p-phenylene-4-phenyl)-1,2,4-triazole | $5 \times 10$ Ωcm |
| Polyquinoxaline | $2 \times 10^0$ Ωcm |

As shown in Table 1, the heat-resistant aromatic polymers having heterocyclic rings in the molecular chain thereof can be converted into products of high conductivity by pyrolysis. Presumably, this is because elements such as oxygen, sulfur and nitrogen are taken in the molecules of the pyrolytic products. Heat-resistant heterocyclic aromatic polymers other than those particularly described hereinbefore may be also usable in the practice of the invention.

The pyrolytic products obtained from the three different types of polymers have been described above. It is to be noted here that with any types of polymers used as starting material in the practice of the invention, higher temperatures than 1000° C. are disadvantageous in that the resulting pyrolytic products show a much less tendency of miscibility with polymers binders. Presumably, this is because graphitization takes place in such products. These products may be used as they are, for example, by applying a solution of starting polymer onto a suitable substrate in the form of a film or sheet and then thermally treating the film in situ to convert it into a conductive one. The thus obtained film is brittle but is more flexible than a pyrolytic polyimide film and is thus usable as a film or sheet when supported on the substrate. Alternatively, the products may be powdered and dispersed in a polymer binder, by which conductive compositions covering wide ranges or resistance characteristics and thermister constant can be readily obtained.

Conductive compositions using the pyrolytic products of high conductivity according to another aspect of the invention are described.

In this case, the pyrolytic products are used in the form of a powder and dispersed in a polymer binder. For this purpose, the pyrolytic product has the following merits.

1. The pyrolytic product can be readily broken into powdery pieces having a size of below $1\mu$ by mechanical means.

2. Very or ultra fine powder of a pyrolytic product can be readily obtained since a starting polymer prior to the pyrolysis may be formed into a very thin film such as by casting or into very fine particles such as by a spray-drying technique, and subsequently pyrolyzed. The powder obtained from the very thin film is in the form of flakes which are more advantageous over particulate powder.

3. The pyrolytic product is an organic material which contains a large quantity of hydrogen atoms therein differently from graphite or carbon black, so that it is readily miscible with most of polymer binders and solvents, showing little or no tendency of being coagulated or aggregated to form secondary particles.

In general, the pyrolytic product is used in an amount of 50 to 90% by weight of the composition so as to satisfactorily impart the electrical characteristics of the product to the composition. Larger amounts are unfavorable since the film-forming property of the composition may be lost.

The pyrolytic products obtained from the polymer resins described hereinbefore are all useful for preparing the conductive compositions according to the invention.

Meanwhile, those films which are obtained by dispersing a powder of silver or carbon black in a polymer matrix are widely applied as a conductor, resistor or heater for printed circuit or substrate in the field of electronics. The silver-dispersed conductive film (hereinafter referred to simply as silver film) has generally a specific resistance of below $10^{-3}$ Ωcm and a sheet resistivity as low as below 1Ω/□. On the other hand, the carbon black-dispersed film (hereinafter referred to simply as carbon black film) has a specific resistance of above $10^{-2}$ Ωcm and it is difficult to obtain a carbon black film whose sheet resistivity is below 10/□. The cost of the silver film is considered as high as 10 to 50 times that of the carbon black film depending on a variation in cost of silver. Accordingly, there has been a demand for a novel type of conductive film which can fill the gap between the silver and carbon black films and can be also used as a substitute for the silver film from viewpoints of cost and property (resistance) and which are more inexpensive than but show almost the same level of electrical property as the silver film. In order to satisfy the demand, it will readily occur to one to mix silver and carbon black or graphite and disperse the mixture in polymer binder. However, carbon black and silver are poor in affinity. Accordingly, it is difficult to disperse them in a common binder to form a film of low resistance. There is also known another type of conductive film using copper or nickel but the film of this type involves many problems such as in dispersability, resistance to oxidation and the like. Thus, reliable products have not been obtained yet. Further, a conductive film using a powder of copper coated with silver on the surface thereof is known but it has little merit in economy. In addition, carbon black-graphite conductive films have been proposed but graphite shows poor affinity for carbon black similarly to the case of silver and carbon black, and thus large amounts of graphite can not be incorporated in the film. In most case, the carbon black-graphite conductive film shows a drawback that the particles are not uniformly dispersed in polymer binder, so that the film becomes poor in adhesiveness to substrate and can hardly be applied as a conductive adhesive.

Recently, attention has been drawn to flaky graphite or carbon black. In view of a fact that the high conductivity of a silver conductive film is based on the flaky form of the silver powder which serves to increase an effective contacting area between any adjacent powdery particles, the flaky carbon black or graphite is considered useful. However, such flaky carbon black or graphite is not stably supplied in low cost at present.

In accordance with a further aspect of the invention, there is provided a conductive composition which comprises a silver powder and a powder of the pyrolytic product dispersed in a polymer binder. The powder of the pyrolytic product has great merits that when mixed with a silver powder, it does not undergo any chemical reaction with the silver, causing no coagulation of silver particles and particles of the pyrolytic product and that the powder of the pyrolytic product is miscible with most of polymer binders, ensuring uniform dispersion of the powders in binder.

By the mixing, a conductive film showing a sheet resistivity in the range of 1 to $10\Omega/\square$ can be readily obtained. Further, in order that a conductive film showing a sheet resistivity of below $1\Omega/\square$ is made, at least 50 wt% of silver can be replaced by the pyrolytic product. This corresponds to about 80% calculated as volume and thus an amount of silver can be reduced considerably. In general, the silver film contains 50 to 90 wt% of silver. In the practice of the invention, any mixing ratio of silver and the pyrolytic product may be used depending on the desired level of electrical properties. A total amount of the powders of silver and pyrolytic product is generally in the range of 50 to 90% by weight of the composition.

As a matter of course, powders of metals other than silver may be used including gold, nickel, copper, zinc, chromium, tin, indium, cobalt, iron, silver-palladium, platinum-gold, gold-palladium, palladium, palladium-platinum and the like though silver is preferable.

Polymers used as a binder may be any of ordinary ones used for this purpose in view of adhesiveness, film-forming property and heat-resistance and include, for example, polyurethane, epoxy resin, phenolic resin, phenoxy resin, silicone, polyimide, polyamide-imide, fluorocarbon resin, polyxylene, polyester, polyvinyl acryl resin, melamine resin, polyvinyl resin, polyamide, polysulfide and the like.

In a still further aspect of the invention, there is provided a conductive composition which comprises a carbon black or graphite powder covered with a pyrolytic product and/or a metallic powder dispersed in a polymer binder. By this, the excellent electrical characteristics of carbon black or graphite can be effectively utilized and when used in combination with a metallic powder, the immiscibility of such carbon material with the metallic powder can be overcome with the aid of the covered product which is free of aggregation when mixed with the metallic powder. In addition, expensive metallic powder can be more reduced in amounts as compared with the case where the pyrolytic product alone is used in combination with the metallic powder.

In order to illustrate merits of the pyrolytic product-covered carbon black or graphite, a procedure of making the covered powder.

Carbon black powder having a size of about $0.05\mu$ is commercially available. This powder is charged into a solution of about 5% of a pyrolyzable polymer in a suitable solvent and vigrously agitated such as by a screw, followed by drying to evaporate the solvent and then curing the resin. The resulting carbon black dispersing resin is pyrolyzed at a suitable temperature to form a pyrolytic product dispersing therein the carbon black powder. This product is then milled or powdered and kneaded together with a solvent, a polymer binder and/or a metallic powder such as silver. The mixture is then shaped into a desired form such as of a film or sheet. In the above procedure, the carbon black-dispersed resin is once prepared and pyrolyzed, so that a powder of carbon black-pyrolytic product may take the forms as shown in FIGS. 11a through 11c, in which at 11 is indicated a carbon black particle and at 12 is the pyrolytic product. In FIG. 11a, a single particle of carbon black is completely covered with the pyrolytic product. However, the particle covered in this manner does not appear in practice, but several to a number of particles of carbon black are believed to be actually covered with the pyrolytic product as shown in FIGS. 11b and 11c. Anyway, the term "covering" used herein is intended to mean states shown in FIGS. 11a through 11c and a similar state of covering in which carbon black or graphite particles are partially or wholly covered with the pyrolytic product individually or in fair number.

The composition where a powder of carbon black or graphite covered with the pyrolytic product is used in combination with a metallic powder has some advantage over a composition where a pyrolytic product is used together with a metallic powder: (1) The specific resistance of a pyrolytic product is about $1\times10^{-2}\Omega cm$ at a maximum whereas that of carbon black or graphite is 1/10 time as small, so that the covered or composite powder becomes lower in resistance than the pyrolytic product itself; and (2) The starting material for pyrolytic product is higher in cost than carbon black or graphite, leading to a reduction of cost.

The present invention is illustrated particulaly by way of examples.

EXAMPLE 1

This example illustrates an application of a pyrolytic product of a plyamide-imide (HI-400, product of Hitachi Chemical Co., Ltd.) as a conductor or resistor film.

A solution of polyamide-imide was applied onto a substrate, dried and thermally treated to give, for example, a resistor shown in FIG. 12, in which an insulating substrate 21 made of, for example, a ceramic or bakelite is applied on the surface thereof with a resistor film 22. A reason why the insulating substrate 21 is used is to make up for the mechanical strength of the film 22. Then, a conductive paste such as carbon black, graphite, silver, silver-palladium or the like paste is printed on the film 22 as usual to form electrodes 23 arranged parallel to each other.

Figure 13:
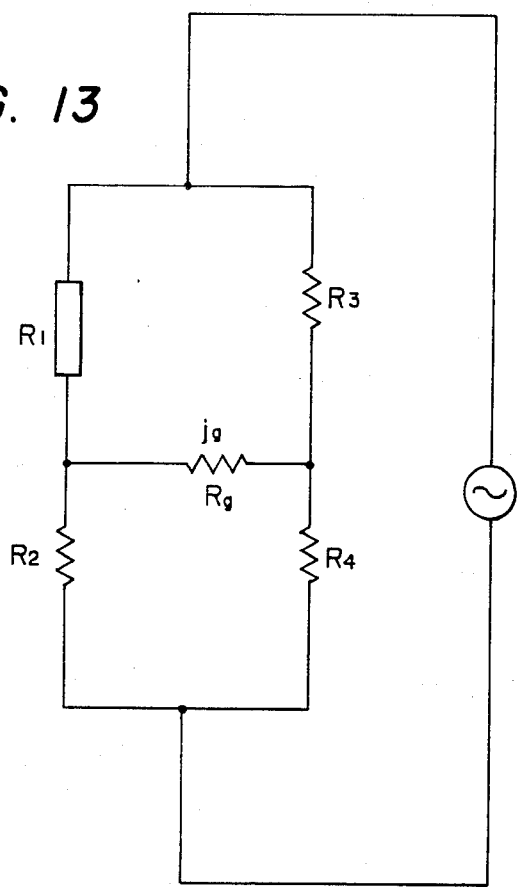
FIG. 13 is a circuit diagram for temperature detection in which an element using a thermally treated product is used as a thermister.

The element of this arrangement can be used, for example, as a temperature sensor. In FIG. 13, there is shown a circuit diagram for the element used as a temperature detector. This circuit is a so-called wheatstone bridge in which when an impedance of the element is represented by impedance $R_1$ and at least one of impedances $R_2$, $R_3$ and $R_4$ is made variable so that electric current $i_g$ passing through impedance $R_g$ becomes zero, $R_1$ can be determined according to the following equation $$R_1 = R_2 R_3 / R_4$$

The temperature to be measured can be determined from this value of $R_1$.

At this time, the output sensitivity increases with an increase of the thermister constant but the B constant cannot be made too great since an optimum impedance has to be taken into account.

Figure 14:
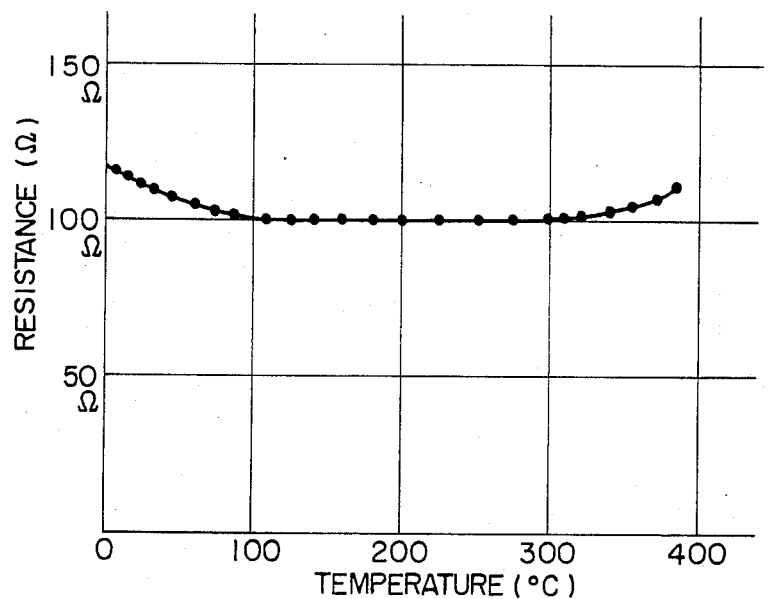
FIG. 14 is a graph showing a relation between a resistance and a temperature of a conductor made of a thermally treated polymer according to the invention.

Then, a conductor obtained by thermally treating polyamide-imide film of 25μ thickness at a temperature of 700° C. for 4 hours in vacuo was applied with electrodes as shown in FIG. 12 to give an element. The electrode was made of silver-palladium, i.e. a paste of silver-palladium was printed on the film prior to the thermal treatment and cured simultaneously with the thermal treatment. The resistance-temperature characteristic of this element is shown in FIG. 14. The resistance-temperature characteristic reveals that the temperature dependence of this element over a wide range of 100° to 300° C. becomes zero and thus the element has an excellent conductivity characteristic. Accordingly, this element can be applied as a heater by applying a constant voltage or constant current between the electrodes.

Figure 15A:
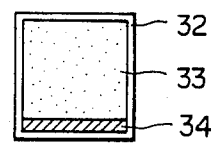
FIGS. 15a and 15b are, respectively, schematic plan and cross-sectional views showing an element using a thermally treated polymer film as a resistor or conductor.
Figure 15B:
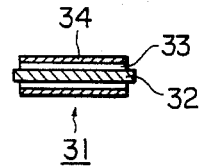

In FIG. 15a and 15b, there is shown a sandwich-type resistor or conductor using a 10μ thick film of the pyrolytic pyrolytic film of the polyamide-imide. In this case, it is desirable that film has a specific resistance of above $10^4$ Ωcm. In the figure, there is shown an element generally indicated at 31, which includes a conductor film 32, electrodes 33 applied or printed on the film 32, and a metal foil 34 from which a lead wire is taken out. When the specific resistance of the film is below $10^{10}$ Ωcm, it is easy to make an element having a resistance of $10^6$Ω, thus it being possible to make the value within an optimum impedance range sufficient to use in an electronic circuit.

The element of the just-mentioned type is usable as a thermometer, and applicable to a thermister barometer, temperature regulator, fire alarm, anemometer, level sensor and the like.

EXAMPLE 2

Figure 16:
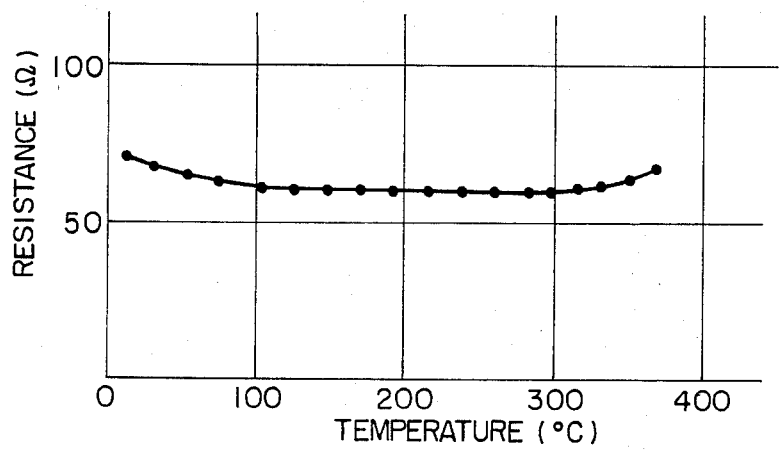
FIG. 16 is a graph showing a relation between a resistance and a temperature of a pyrolytic product derived from an aromatic polyamide according to the invention.

An aromatic polyamide obtained from (m-phenylenediamine and isophthaloyl chloride) was formed into a 25μ thick film and adhered to an insulating substrate, onto which a silver-palladium paste was applied as electrodes. Then, the film was thermally treated at 650° C. for 4 hours in vacuo and the paste was cured simultaneously to give an element of the type as shown in FIG. 12. The resistance-temperature characteristic of this element is shown in FIG. 16. From the figure, it is seen that the resistance-temperature characteristic of the element is held constant in a temperature range of 100° C. to 300° C., thus showing that the element has an excellent conductivity. This element can be used as a heater when applied with a constant current or voltage between the electrodes.

When the above procedure was repeated using polyoxadiazole resins instead of the aromatic polyamide, and a treating temperature of 550° C., there were obtained elements which showed a similar tendency of the resistance-temperature characteristic illustrated above.

EXAMPLE 3

This example illustrates a conductive composition obtained by dispersing in a polymer binder a powder of a pyrolytic product from a polyamide-imide of the same type as used in Example 2.

That is, A polyamide-imide film having a thickness of 0.5 to 5μ which had been made according to a casting technique was pyrolyzed in vacuo for 4 hours at different temperatures ranging 45° C. to 800° C. After completion of the pyrolysis, the treated films were each powdered for 2 hours by means of an attritor and passed through a screen of 400 mesh. The passed powder was mixed with an epoxy resin binder in a solvent such as dimethylacetamide at a powder to binder ration of 80:20. The mixture was completely kneaded on three rolls and printed on a ceramic substrate by the use of a 200 mesh screen, followed by drying to obtain a printed film.

The electrical properties of the films are shown below.

TABLE 2

| Pyrolysis Temperature (°C.) | Sheet Resistivity (Ω/□) | Thermister Constant (°K.) |
|---|---|---|
| 450 | $10^{12}$ | 5000 |
| 600 | $10^3$ | 1800 |
| 700 | 200 | 250 |
| 800 | 100 | 150 |

From the above results, it will be seen that the sheet resistivity and thermister constant can be widely varied by changing the treating temperature even when the ratio of the filler to binder is held constant. This means that the electrical properties alone of the composition can be controlled arbitrarily while keeping the mechanical properties of the composition almost constant.

When the printed film was subjected to a thermal stability test of 85° C. and 500 hrs, it was found that its electrical characteristics varied within only 10%, thus showing an excellent heat stability. The maximum temperature at which the printed film could be used was 250° C.

The conductive composition may be applied onto a flexible substrate such as a polyester film to give a member for flexible circuit.

EXAMPLE 4

This example illustrates a composition of a powder of a pyrolytic product of a linear aromatic polyamide dispersed in a polymer binder.

An aromatic polyamide made of (m-phenylenediamine and isophthaloyl cloride) was thermally treated at 700° C. for 4 hours in vacuo and then powdered for 2 hours by means of an attritor, followed by passing through a 400 mesh screen. The passed powder was mixed with a polyimide resin at a mixing ratio of the powder to binder of 80:20 and kneaded on three rolls by the use of a solvent to give a paste. The paste was printed on a ceramic substrate through a 200 mesh screen, followed by drying to give a printed film on the substrate.

The printed film had a sheet resistivity of 30Ω/□ and a variation in resistance of the film placed and a variation in resistance of the film placed under conditions of 85° C. and 5000 hours was found to be within 10%. This excellent thermal stability was better than that of a carbon black-dispersed film obtained in the same manner as described above.

EXAMPLE 5

This example illustrates a conductive composition obtained by dispersing a powder of a pyrolytic product of polyoxadiazole in a polymer binder.

The polyxydiazole was thermally treated for 4 hours in vacuo at different temperatures ranging from 500° C. to 800° C. to give pyrolytic products. Each product was powdered by means of an attritor and passed through a 400 mesh screen. Each powder having a size of below 400 mesh was mixed with a polyamide-imide binder in N, N-dimethylacetamide and kneaded on three rolls. The viscosity of the paste was controlled by the amount of the solvent. The paste was printed on a substrate through a 100 mesh sereen. The electrical properties of printed films where a mixing ratio by weight of the powder to binder was 70:30 are shown in Table 3 below.

TABLE 3

| Pyrolysis Temperature (°C.) | Sheet Resistivity ($\Omega/\square$) | Thermister Constant (°K.) |
|---|---|---|
| 500 | $10^{10}$ | 4800 |
| 600 | $10^3$ | 2000 |
| 700 | 100 | 180 |
| 800 | 25 | 100 |

EXAMPLE 6

This example illustrates a conductive composition obtained by dispersing a powder of the pyrolytic product used in Example 4 and a metallic powder in a polymer binder.

That is, a powder of the pyrolytic product of 400 mesh and a silver powder were mixed in a mixing ratio by weight of 40:60. The mixed powder was then admixed with a varnish containing 30% polyamide-imide resin (HI-400, product of Hitachi Chemical Co., Ltd.) at a mixing ratio of 10:12, followed by kneading on three rolls while dropping methyl pyrrolidone as a solvent thereby obtaining a paste. This paste was printed on an alumina substrate by the use of a 200 mesh screen and cured at 200° C. for about 2 hours. The sheet resistivity of the resulting film was found to be $0.3/\square$. When the mixing ratio of the pyrolytic product powder to silver powder was 50:50, the sheet resistivity was about $0.6/\square$.

The paste obtained in this example shows substantially the same color as silver paste, and no variation in viscosity of the paste nor coagulation of particles was observed as would be experienced in the case where carbon black was mixed.

EXAMPLE 7

A polyamide-imide resin in the form of a varnish using acetamide or xylene was used as a starting material and casted on a clean glass substrate to form a film with a thickness of 5000 Å in average. The film was thermally set at a temperature of 200° to 250° C. and the glass substrate was immersed in water, followed by peeling the resin film from the substrate mechanically. This film was pyrolyzed at 850° C. for 4 hours to obtain a black pyrolytic product having a density of about 1.7. This product was powdered by means of an attritor for 2 hours to obtain a flaky powder having a thickness of below 5000 Å and a size of below 1μ. This powder was dispersed in a phenoxy resin binder (15 wt% based on the composition) together with a silver pwoeder to give a paste. This paste was printed on a substrate through a 300 mesh screen to form a film. When the pyrolytic powder was in the range below 50 wt% (83 vol%), the sheet resistivity was in the range of below $0.3\Omega/\square$. To keep the sheet resistivity in the range of below $1\Omega/\square$, the pyrolytic powder could be added up to 75 wt% based on the total amount of the conductive powders. As a matter of course, the sheet resistivity over $1\Omega/\square$ is usable in practice, so that the amount of the pyrolytic powder depends on the purpose in end use of the film.

Then, the polyamide-imide varnish used above was spray-dired in an atmosphere of 350° C. to obtain spherical particles of the resin having a size below 1μ. These spherical particles were pyrolyzed to obtain pyrolytic particles having a size below 0.8μ. These particles were also usable in combination with silver. However, as compared with the flaky powder, the resistance is about 1.5 to 2 times as high at the same level of concentration.

EXAMPLE 8

Polyoxadiazole and polybenzothiazole show metal-like conductivity when pyrolyzed.

These materials in the form of a film were pyrolyzed and powdered, followed by kneading together with a silver powder and an epoxy resin on three rolls. The resulting paste was printed through a 200 mesh screen to obtain silver-pyrolyric product films. These films were subjected to a measurement of sheet resistivity, with the results shown below.

TABLE 4

| Pyrolytic Product | Amount of Pyrolytic Product (parts by wt.)* | Binder (parts by wt.)* | Sheet Resistivity ($\Omega/\square$) |
|---|---|---|---|
| Polyoxadiazole | 40 | 40 | 0.20 |
| Polyoxadiazole | 60 | 45 | 0.6 |
| Polybenzothiazole | 40 | 40 | 0.15 |
| Polybenzothiazole | 60 | 45 | 0.50 |

*Based on 100 parts of silver.

In order to make the sheet resistivity below $1\Omega/\square$, it is found that the pyrolytic polyoxadiazole and polybenzothiazole are used in amounts of above 65 and 70%, respectively, based on silver though it may vary depending on the amount of binder.

As is apparent from Examples 7 and 8, when the amount of pyrolytic products in the conductive composition using a metallic powder, e.g. silver powder, is controlled to be in the range above 60–80% by weight of silver, the sheet resistivity may be controlled to be below $1\Omega/\square$ depending on the amount of polymer binder, the shape of the pyrolytic product powder (i.e. flake, sphere or block) and the like.

EXAMPLE 9

This example illustrates a conductive composition using carbon black or graphite powder covered with a pyrolytic product.

Into a varnish containing 30 wt% of polyamide-imide resin was charged acetylene black in an amount of 30 wt% of the polyamide-imide, followed by agitating by a screw and casting on a glass plate. The casted film was thermally treated together with the glass plate. After having been cooled, the glass plate was immersed in water and the carbon black film was removed from the glass plate. This film was thermally treated at 600° C.

for 4 hours to obtain a carbon black-pyrolytic product composite film. In table 5, there are shown electrical properties of the starting materials and the product.

TABLE 5

| Material | Heat Treating Conditions | Specific Resistance ($\Omega$cm) |
| --- | --- | --- |
| Polyamide.imide-carbon black | no | $5 \times 10^5$ |
| Polyamide.imide-carbon black | 600° C., 4 hrs | 0.65 |
| Polyamide-imide | 600° C., 4 hrs | 103 |
| Polyamide.imide-carbon black | 500° C., 4 hrs | 1500 |

When comparing the specific resistance values of pyrolytic polyamide.imide-carbon black and pyrolytic polyamide-imide, the former is about 1/200 time the latter. From this, the addition of carbon black is considered very effective to reduce the specific resistance.

The composite film was powdered for about 2 hours by means of an attritor to obtain a powder of 1000 mesh. This powder and a silver powder composed of a mixture of flaky and colloidal precipitation silver were dispersed in a polyamide-imide binder in a solvent to give a paste. In this case, the binder was used in an amount of 15% of the compositions.

The paste was printed through a 200 mesh screen and dried to obtain a film. In Table 6, there is shown a relation between a composition of the film and a sheet resistivity.

TABLE 6

| Amounts (wt %) | | |
| --- | --- | --- |
| Ag | Pyrolytic Product | Sheet Resistivity ($\Omega$/□) |
| 100 | 0 | 0.15 |
| 90 | 10 | 0.17 |
| 60 | 40 | 0.30 |
| 25 | 75 | 2.2 |

From the above, it is seen that in order to make the sheet resistivity below 1$\Omega$/□, 30 wt% of silver is sufficient, leading to a saving of cost.

EXAMPLE 10

An aromatic polyamide was dissolved in a mixed solvent of acetamide and pyrrolidone to obtain a varnish containing 5-10 wt% of the aromatic polyamide. Then, graphite powder having a size of 0.1$\mu$ was dispersed in the varnish, followed by well agitating and separating the graphite powder having a thin layer of the varnish on the surface thereof by means of a centrifugal separator. The thus separated powder was dried at 300° C. and thermally treated in the same manner as in Example 9 to obtain a glossy black powder. This powder was completely different in appearance from the initial powder. Granular masses were found, so that the powder was subject to a ball mill to give a powder with a size of 500 mesh. This powder was mixed with silver in desired ratios and admixed with an epoxy resin binder to give a paste. The paste was printed on a substrate through a 200 mesh screen and dried. The conductive film in which the silver and graphite-pyrolytic product were mixed in a ratio of 1:1 had a sheet resistivity of 0.17$\Omega$/□.

When the graphite-pyrolytic product powder was added to an existing silver-polyester paste to make a film, an amount of silver could be reduced to 40% so as to attain the same level of electrical characteristics, thus being very advantageous from a viewpoint of economy.

What is claimed is:

1. A conductive composition comprising 10 to 50 weight percent of a film-forming polymer binder and a balance of a powder of a pyrolytic product obtained by thermally treating polyoxadiazole at a temperature ranging from 600° C. to 1000° C. in vacuo or in an inert atmosphere, the thermal treatment being maintained for a time sufficient to provide a pyrolytic product having a specific resistance of $10^{-1}$ ohm-cm or below.

2. A conductive composition according to claim 1, wherein said powder is in the form of flakes.

3. A conductive composition according to claim 1, wherein prior to the thermal treatment, the polymer is mixed in a solvent with carbon black or graphite of a powder form, formed into a film or sheet and thermally treated, and the treated film or sheet is powdered, whereby the carbon black or graphite powder is covered with the pyrolytic polymer.

4. A conductive composition according to claim 1, further comprising a metallic powder.

5. A conductive composition according to claim 4, wherein the amount of the metallic powder is sufficient to lower the sheet resistivity below 1 ohm/□.

6. A conductive composition according to claim 4, wherein said metallic powder is silver powder.

7. A conductive pyrolytic product obtained by thermally treating polyoxydiazole at a temperature ranging from 600° C. to 1000° C. in vacuo or in an inert gas atmosphere, the thermal treatment being maintained for a time sufficient to provide a pyrolytic product having a specific resistance of $10^{-1}$ ohm-cm or below.

* * * * *